Paper Class 3. 233

CLASSIFICATION
8245X
DIVISION.

Isaac Fisher Jr

Making Sand Paper &c.

DIV. 15

Patented 14 June 1834

6-14-1834

Fig. 1.

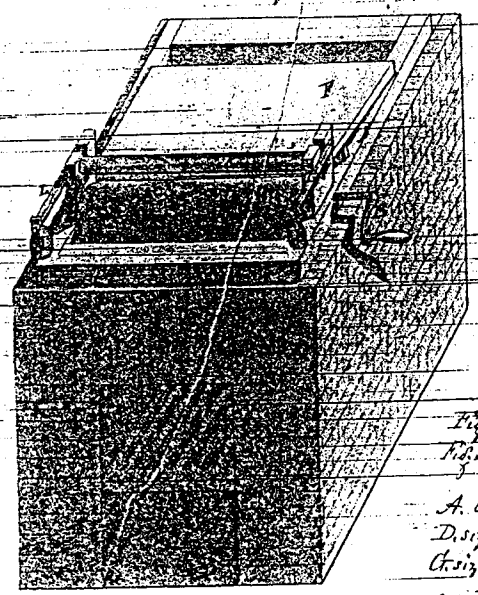

Fig. 2.

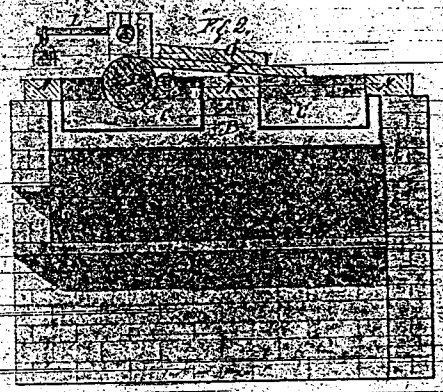

References.
Fig. 1. Perspective view.
Fig. 2. Vertical section.

A. brick arch. B. heater. C. size pans.
D. size cylinder. E. crank. F. wooden apron
G. size board. H. metallic cylinder to regulate
quantity of size delivered. I. springs to press H up
K. metallic pressing cylinder. L. lever to keep K down
M. weight. N. frame.

Patent Office Dec. 7 1841

Made under the direction of the Commissioner of Patents
in conformity with act of Congress 3 March 1837.

H. L. Ellsworth
Commissioner of Patents

8245x June 14. 1834 [illegible]

Isaac Fisher Jr of Springfield Vermont

Letters Patent

The Schedule referred to in these Letters Patent and making part of the same containing a description in the words of the said Isaac Fisher Junr himself of his improvement in making glass or sand paper, so called.

To all to whom these presents shall come. Be it known that I Isaac Fisher Jr of Springfield in the County of Windsor and State of Vermont. have invented a new and useful improvement in making glass or sand paper so called. and that the following is a full and exact description of the manner of using the same. as invented by me. A large copper pan 19 by 28 inches square, by six inches deep. which may be called a heater, is to be set in an arch of brick over said heater, is placed a frame of wood raised at the edges in which are set two smaller copper pans. one 12 by 16 inches. and the other 10 1/2 by 16 inches square. and both three inches deep extending nearly to the bottom of the heater. which may be called size pans. over one of these size pans is placed a stone cylinder covered with hatters felting. in length 14 inches and whose diameter may be 6 inches. called the size cylinder and which wades about one third of its diameter in the size contained in the size pan beneath it. the arbor of which rests on said frame, and has at one end thereof, a hand crank for turning the same. and by which motion is communicated to it. At one end of said frame and resting upon it, is a wood apron which may be 13 by 16 inches square. by one inch thick and which is hung upon the under side to the frame by means of hinges with an inclination of about 10 degrees. for the reception of a mahogany board 3/16ths of an inch thick. and adapted to the length and width of the paper ~~to be~~ to be sized. called a size board, at the side of and parallel to said size cylinder. about half an inch below the upper end of said apron is a small metallic or stone cylinder, the pivots of which run in horizontal slits in said frame. and is made to bear against said size cylinder by means of two spiral springs attached one at each end thereof and connected with screws in said frame beyond the size cylinder. by turning which screws the springs may be tightened or loosened. the use of this cylinder is by its pressure to govern the quantity of size carried up by the felting to the paper while passing over it. which should vary according to the coarseness or thickness of the glass or sand paper. Directly over the size cylinder is placed another small metallic or stone cylinder whose diameter may be 2 inches. the pivots of which run in uprights in said frame. the space between which should be a little less than the thickness of the size board and the paper to be passed between them. and may be regulated by means of a screw. under each pivots of said cylinder. on these pivots rest two levers which at one end are confined to the uprights and are made to bear down upon said pivots by means of springs or weights attached to the other end of said levers. so as to produce an uniform pressure of the paper. upon the size cylinder while the same is passing over it.

The operation is thus performed. The heater being kept nearly full of water, raised to almost a boiling heat for the purpose of keeping the size at a proper temperature in the size pans. a sheet of paper of any convenient size, after the same has received a coat of powder or grains upon it and been dried is placed upon the apron with the sanded side down. the size board is then laid upon it. and both by turning the crank are made to pass through between the size cylinder and small cylinder above it. the paper while thus passing over the size cylinder receives from the saturated felting, a sufficient quantity of size to make the powder or grains adhere firmly to the paper after which it is laid aside and dried.

The said Pans and the several parts of .. said machine may be made of the aforesaid dimensions. or of any convenient proportional size. according to the extent of the building and the business carried on. The said Fisher does not claim the invention of the above pans or the manner of setting the same. or the separate parts of 8245x June 14, 1834

Said machine. but claims the invention of the manner of applying the same to the purposes of making Glass or sand Paper. in manner above stated.

Witness
Saml W Porter
Fredk A Porter

Isaac Fisher Jun

Drawing (87 Words)

(Granted June 14. 1834.)